(12) United States Patent
Kern et al.

(10) Patent No.: US 9,802,640 B2
(45) Date of Patent: Oct. 31, 2017

(54) BALL SCREW ASSEMBLY

(71) Applicant: Steering Solutions IP Holding Corporation, Saginaw, MI (US)

(72) Inventors: Paul E. Kern, Reese, MI (US); Eric D. Pattok, Frankenmuth, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 35 days.

(21) Appl. No.: 14/865,713

(22) Filed: Sep. 25, 2015

(65) Prior Publication Data
US 2017/0088162 A1 Mar. 30, 2017

(51) Int. Cl.
*B62D 5/04* (2006.01)
*B62D 3/12* (2006.01)
*F16H 25/22* (2006.01)

(52) U.S. Cl.
CPC ............. *B62D 5/0448* (2013.01); *B62D 3/12* (2013.01); *B62D 5/0421* (2013.01); *F16H 25/2223* (2013.01)

(58) Field of Classification Search
CPC ....... B62D 5/0448; B62D 5/0421; B62D 3/12
USPC ............ 74/89.23, 89.24, 89.25, 89.31
See application file for complete search history.

(56) References Cited

U.S. PATENT DOCUMENTS

| 3,512,426 | A | * | 5/1970 | Dabringhaus | ....... | F16H 25/2214 |
| | | | | | | 29/893.37 |
| 3,667,311 | A | * | 6/1972 | Wysong | .............. | F16H 25/2223 |
| | | | | | | 74/424.75 |
| 5,203,421 | A | * | 4/1993 | Ueno | ....................... | B62D 3/02 |
| | | | | | | 180/400 |
| 8,191,439 | B2 | * | 6/2012 | Kobayashi | .......... | F16H 25/2409 |
| | | | | | | 74/461 |
| 8,196,487 | B2 | * | 6/2012 | Bless | ...................... | B62D 3/12 |
| | | | | | | 74/422 |
| 8,863,601 | B2 | * | 10/2014 | Chen | .................. | F16H 25/2219 |
| | | | | | | 74/424.82 |
| 8,950,283 | B2 | * | 2/2015 | Watanabe | .................. | B21J 5/12 |
| | | | | | | 74/424.82 |
| 2007/0114093 | A1 | * | 5/2007 | Osuka | .................. | B62D 5/0403 |
| | | | | | | 180/444 |
| 2007/0204711 | A1 | * | 9/2007 | Budaker | .............. | B62D 5/0448 |
| | | | | | | 74/388 PS |
| 2011/0048838 | A1 | * | 3/2011 | Asakura | ............... | B62D 5/0427 |
| | | | | | | 180/444 |
| 2012/0325036 | A1 | * | 12/2012 | Harada | ...................... | B21J 5/12 |
| | | | | | | 74/424.86 |
| 2014/0352466 | A1 | * | 12/2014 | Ikeda | .................. | F16H 25/2214 |
| | | | | | | 74/89.23 |

* cited by examiner

*Primary Examiner* — Tony H. Winner
*Assistant Examiner* — Gabriela C Craciun
(74) *Attorney, Agent, or Firm* — Cantor Colburn LLP

(57) ABSTRACT

A ball screw assembly includes a helical path for a plurality of balls to be routed through, the helical path extending from a first end to a second end. The ball screw assembly also includes a recirculation path extending from a first transition location to a second transition location. The recirculation path includes a first segment defined by a first arc portion of a first ellipse. The recirculation path also includes a second segment defined by a second arc portion of the first ellipse. The recirculation path further includes a third segment defined by an arc of a second ellipse, wherein the first ellipse and the second ellipse are disposed in a common plane.

20 Claims, 4 Drawing Sheets

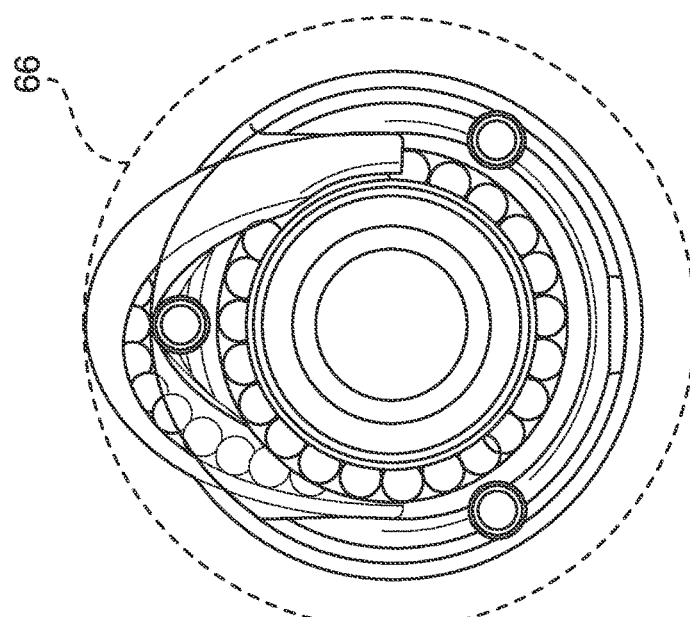
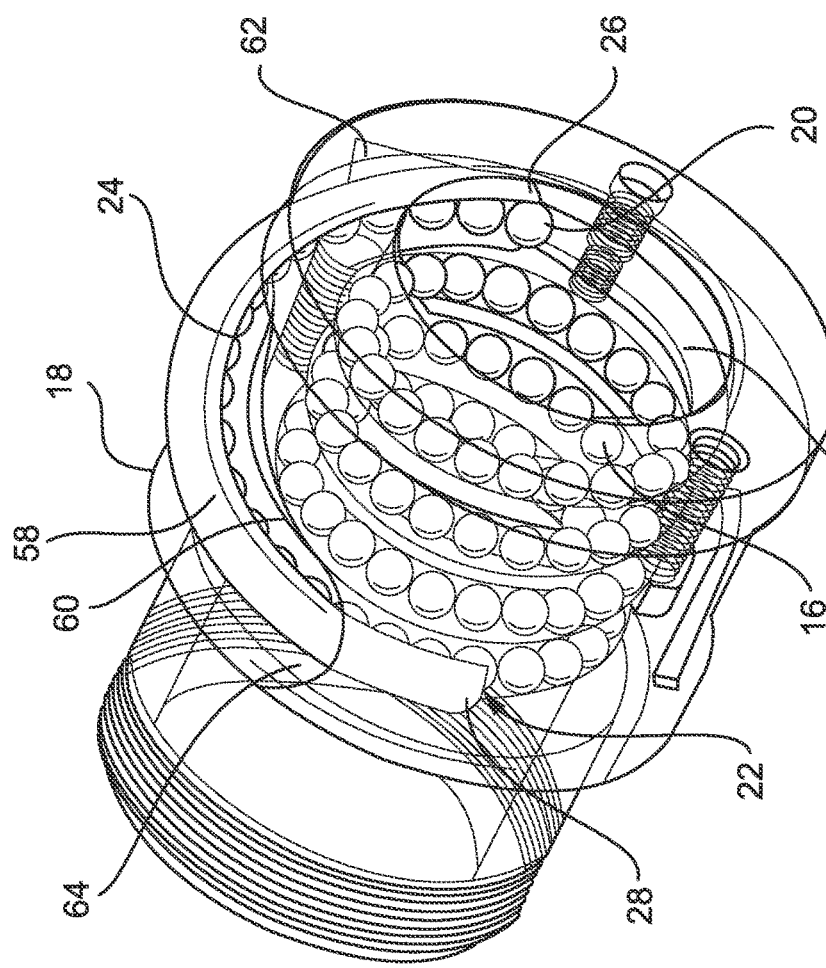
FIG. 2
FIG. 1

US 9,802,640 B2

BALL SCREW ASSEMBLY

BACKGROUND OF THE INVENTION

The embodiments described herein relate to ball screw assemblies and, more particularly, to ball recirculation path for ball screw assemblies.

Some vehicle power steering systems employ an electric motor that interacts with a ball screw assembly which converts rotary motion of the electric motor to linear motion. The ball screw assembly includes a ball recirculation tube that follows a path with an elliptical trajectory.

The above-described arrangement, while effective for functionality and noise reduction, has limitations in the areas of packaging and manufacturing. In particular, a large envelope is needed to fit around the ball recirculation tube that encloses the ball recirculation path. The large envelope limits the ball track pitch that is available to designers, thereby eliminating the possibility of smaller pitch designs due to potential interference between the ball recirculation path and adjacent ball tracks of a helical path through which the load carrying balls travel. Additionally, a complex geometry for the ball nut mating interface leads to complications with manufacturing process capability.

SUMMARY OF THE INVENTION

According to one aspect of the disclosure, a ball screw assembly includes a helical path for a plurality of balls to be routed through, the helical path extending from a first end to a second end. The ball screw assembly also includes a recirculation path extending from a first transition location to a second transition location, the first transition location located proximate the first end of the helical path to transfer the plurality of balls from the helical path to the recirculation path, the second transition location located proximate the second end of the helical path to transfer the plurality of balls from the recirculation path to the helical path. The recirculation path includes a first segment defined by a first arc portion of a first ellipse. The recirculation path also includes a second segment defined by a second arc portion of the first ellipse. The recirculation path further includes a third segment defined by an arc of a second ellipse, wherein the first ellipse and the second ellipse are disposed in a common plane.

According to another aspect of the disclosure, a vehicle electric power steering assembly includes a motor for assisting steering maneuvers of the vehicle, a rack and pinion assembly, and a ball screw assembly for converting rotary motion of the motor to linear motion to assist the rack and pinion assembly. The ball screw assembly includes a helical path for a plurality of balls to be routed through, the helical path extending from a first end to a second end. The ball screw assembly also includes a recirculation path extending from the first end of the helical path to the second end of the helical path. The recirculation path includes a first segment defined by a first arc portion of a first ellipse. The recirculation path also includes a second segment defined by a second arc portion of the first ellipse. The recirculation path further includes a third segment defined by an arc of a second ellipse, wherein the first ellipse and the second ellipse are disposed in a common plane.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 1 is a perspective view of a ball nut assembly;

FIG. 2 is an end view of the ball screw assembly showing a schematic of the package environment;

DETAILED DESCRIPTION

Figure 3:
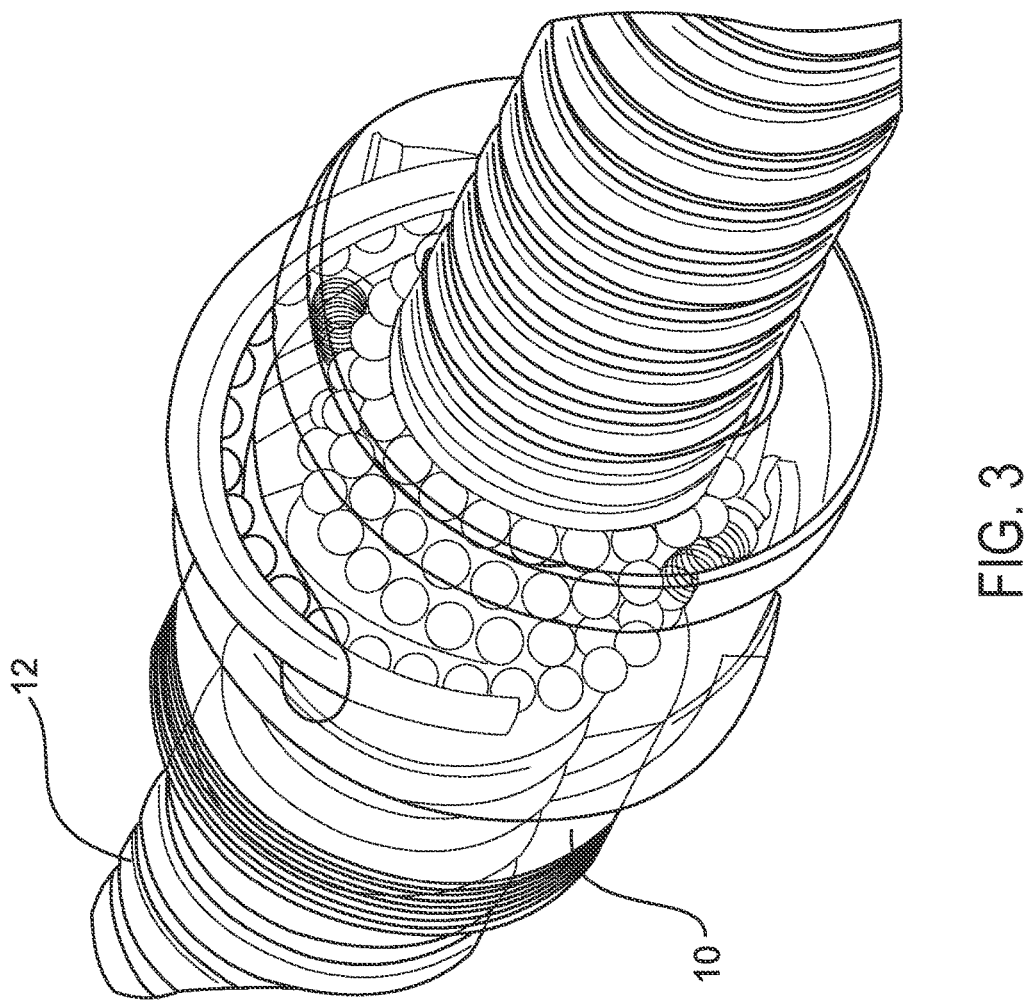
FIG. 3 is a perspective view of the ball screw assembly.
Figure 5:
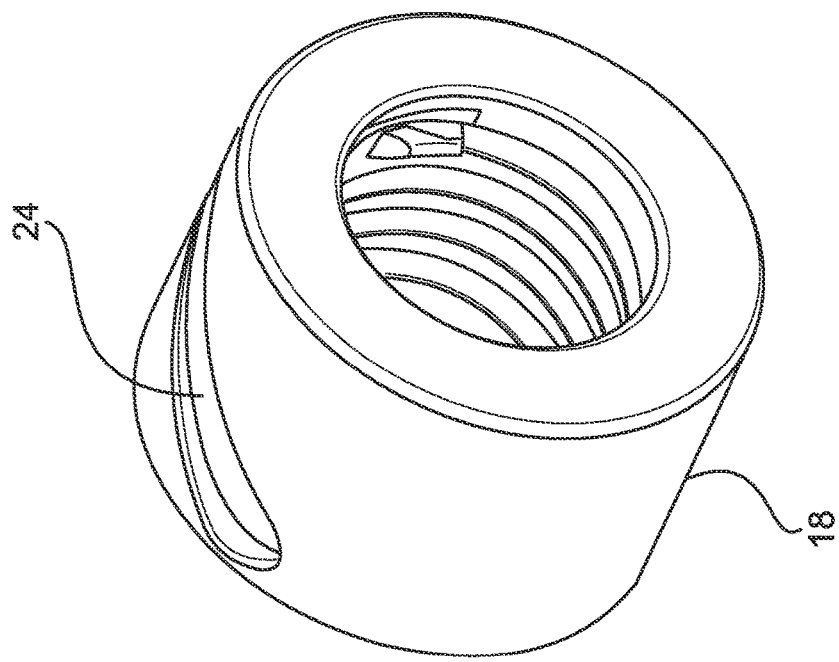
FIG. 5 is a perspective view of the segment ball recirculation path of the ball screw assembly.
Figure 4:
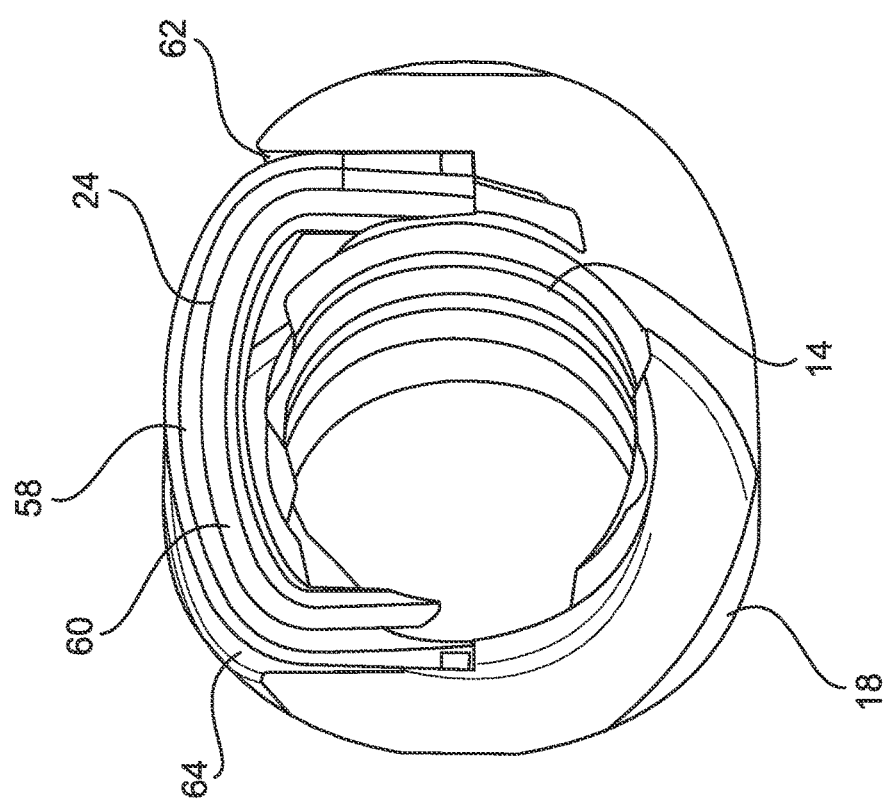
FIG. 4 is a sectional view of a segmented ball recirculation path of the ball screw assembly.
Figure 7:
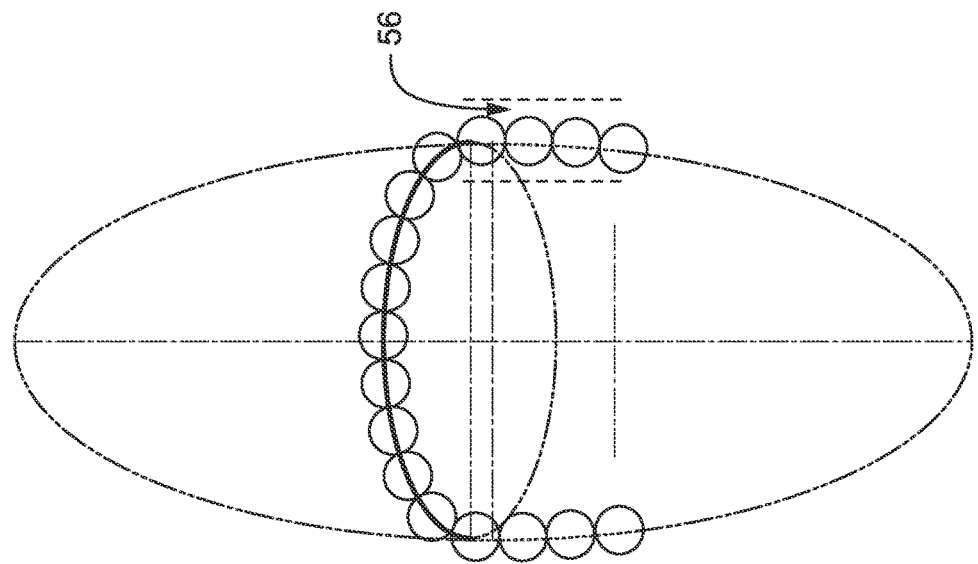
FIG. 7 is a schematic illustration of the return port mating envelope.

Referring now to the Figures, where the invention will be described with reference to specific embodiments, without limiting same, a ball screw recirculation path, such as those used in vehicle electric power steering assemblies, is provided to reduce the overall design envelope required to accommodate the overall ball screw assembly, as will be appreciated from the disclosure herein.

Referring now to FIGS. 1-5 and. 7, a ball screw assembly 10 is illustrated. In some embodiments, the ball screw assembly 10 is employed in a vehicle power steering assembly that assists a user in performing vehicle steering maneuvers. In such embodiments, an electric motor interacts with the ball screw assembly 10 which converts rotary motion of the electric motor to linear motion. The linear motion is applied to a rack and pinion assembly that indirectly controls an angular position of at least one wheel of a vehicle. Intermediate components between the rack and pinion assembly and the wheel(s) include tie rods and an axle, for example. Although the ball screw assembly 10 is described above as being employed in a vehicle power steering assembly, it is to be appreciated that the ball screw assembly 10 described herein may be used in numerous other applications.

The ball screw assembly 10 includes a threaded screw 12 with a helical path 14 which guide a plurality of balls 16 therealong. The plurality of balls 16 are load carrying during movement and urge a ball nut 18 along the threaded screw 12. The helical path 14 extends from a first end 20 to a second end 22 in a helical manner. It is to be appreciated that the balls 16 may travel in either direction along the helical path 14, depending upon which direction the ball 18 is needed to travel. For purposes of discussion herein, a direction of travel of the balls 16 will be described as moving from the second end 22 toward the first end 20 of the helical path 14.

To avoid the plurality of balls 16 from falling out of the helical path 14 upon reaching the first end 20 of the helical path 14, a recirculation path 24 for the balls 16 is provided. The recirculation path 24 extends from a first transition location 26 that is located proximate the first end 20 of the helical path 14 to a second transition location 28 that is located proximate the second end 22 of the helical path 14. The balls 16 are transferred from the helical path 14 to the recirculation path 24 at the first transition location 26. As each ball reaches the first transition location 26, the balls behind it urge the ball further along the overall path and into the recirculation path 24. The balls 16 are transferred from the recirculation path 24 to the helical path 14 at the second transition location 28. The ball recirculation tube 58, 60 is fixed to the ball nut 18 at the return ports 62, 64. The return ports 62, 64 provide the mating envelope 56 for the ball recirculation tube 58, 60.

Figure 6:
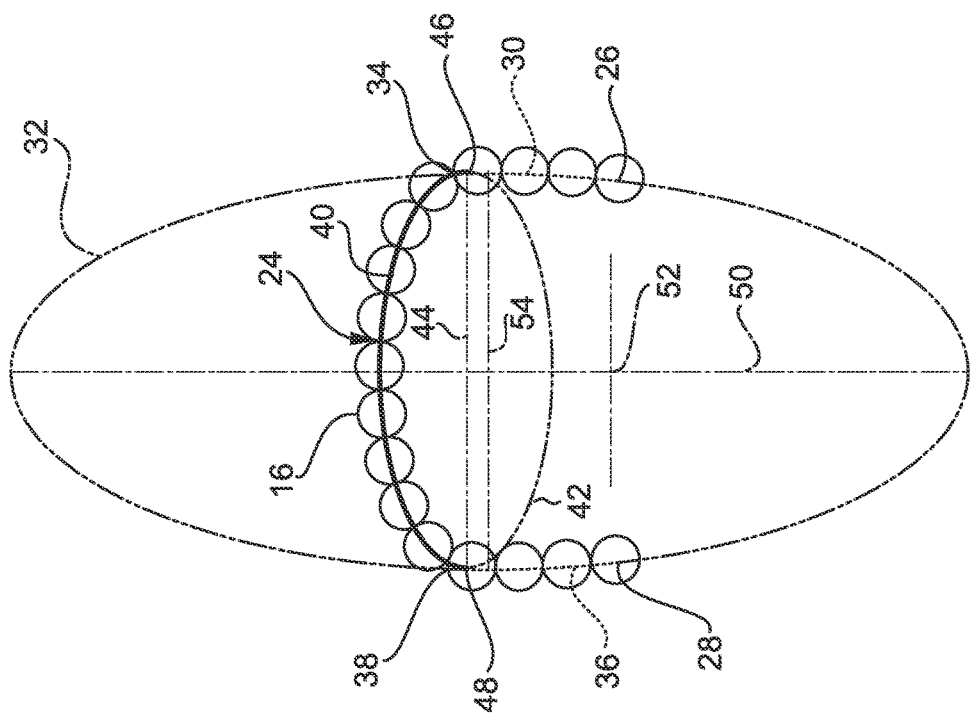
FIG. 6 is a schematic illustration of a recirculation path of the ball screw assembly.

Referring now to FIG. 6, the recirculation path 24 is illustrated in greater detail. In particular, FIG. 6 geometrically illustrates the recirculation path 24 in particular detail. The recirculation path 24 is formed of three segments. A first segment 30 is defined by a first arc portion of a first ellipse 32. The first segment 30 extends along an elongated portion of the first ellipse 32 to be in a substantially, but not completely, linear orientation. The first segment 30 extends from the first transition location 26 to a first segment end 34. The recirculation path also includes a second segment 36 that is similarly oriented relative to the first segment 30, but is disposed on an opposing side of the first ellipse 32. In particular, the second segment 36 is defined by a second arc portion of the first ellipse 32. The second segment 36 extends from the second transition location 28 to a second segment end 38.

In contrast to recirculation paths that continue to follow an elliptical trajectory, such as that of the first ellipse, the recirculation path 24 described herein includes a third segment 40 that deviates from the first ellipse 32 to connect the first segment 30 and the second segment 36. Such a deviation reduces the overall package environment 66 of the ball screw assembly 10, while maintaining the functional advantages of the overall assembly. Specifically, the third segment 40 extends between the first segment end 34 and the second segment end 38. The trajectory of the third segment 40 coincides with an arc portion of a second ellipse 42 that is completely disposed in the same plane as the first ellipse 32. As used herein, the term "completely" describes that the arc of the third segment 40 is substantially within a common plane as the first ellipse 32.

The second ellipse 42 includes a major axis 44 that extends from a major axis first end 46 to a major axis second end 48. The major axis 44 is substantially parallel to a minor axis 54 of the first ellipse 32. As described above, the third segment extends between the first segment end 34 and the second segment end 38. Each of the segment ends 34, 38 are located at an intersection of the first ellipse 32 and the second ellipse 42. The arrangement is defined such that the second ellipse 42 intersects the first ellipse 32 in a tangential manner at the segment ends 34 and 38.

As shown, the second ellipse 42 has a center that is offset from an axis 52 about which the balls 16 travel within the helical path 14. The specific geometric dimensions of the first and second ellipses 32, 42 may vary, depending upon the particular application, but the length of the major axis 50 of the first ellipse 32 is greater than then major axis 44 of the second ellipse 42. This aspect, combine with the tangential intersection of the ellipses, provides the reduction in the overall package environment of the ball screw assembly 10.

The geometric configuration of the segments of the recirculation path 24 provides a reduced mating envelope 56 of the return ports 62, 64. The mating envelope 56 is defined geometrically as a cylinder. This is accomplished by placing the first and second segments 30, 36 along arc portions of the elongated first ellipse 32 that has high eccentricity. In combination with this reduced dimension, another dimension (e.g., height) is reduced by orienting the third segment 40 of the recirculation path 24 along an arc portion of the second ellipse 42 to connect the first and second segments 30, 36 in the manner described in detail above.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A ball screw assembly comprising:
a helical path for a plurality of balls to be routed through, the helical path extending from a first end to a second end; and
a recirculation path extending from a first transition location to a second transition location, the first transition location located proximate the first end of the helical path to transfer the plurality of balls from the helical path to the recirculation path, the second transition location located proximate the second end of the helical path to transfer the plurality of balls from the recirculation path to the helical path, the recirculation path comprising:
a first segment defined by a first arc portion of a first ellipse;
a second segment defined by a second arc portion of the first ellipse; and
a third segment defined by an arc of a second ellipse, wherein the first ellipse and the second ellipse are disposed in a common plane.

2. The ball screw assembly of claim 1, wherein the second ellipse comprises a major axis extending from a major axis first end to a major axis second end.

3. The ball screw assembly of claim 2, wherein the third segment first end is located at an intersection of the first ellipse and the second ellipse.

4. The ball screw assembly of claim 2, wherein the third segment second end is located at an intersection of the first ellipse and the second ellipse.

5. The ball screw assembly of claim 2, wherein the third segment first end and the third segment second end are each oriented tangentially to the first ellipse.

6. The ball screw assembly of claim 2, wherein the first segment extends from the first transition location to the third segment first end.

7. The ball screw assembly of claim 2, wherein the second segment extends from the second transition location to the third segment second end.

8. The ball screw assembly of claim 1, wherein a center of the second ellipse is offset from an axis of the helical path.

9. The ball screw assembly of claim 1, wherein the ball screw assembly is disposed in an electric power steering assembly of a vehicle.

10. A vehicle electric power steering assembly comprising:
a motor for assisting steering maneuvers of the vehicle;
a rack and pinion assembly;
a ball screw assembly for converting rotary motion of the motor to linear motion to assist the rack and pinion assembly, the ball screw assembly comprising:
a helical path for a plurality of balls to be routed through, the helical path extending from a first end to a second end;

a recirculation path extending from the first end of the helical path to the second end of the helical path, the recirculation path comprising:
  a first segment defined by a first arc portion of a first ellipse;
  a second segment defined by a second arc portion of the first ellipse; and
  a third segment defined by an arc of a second ellipse, wherein the first ellipse and the second ellipse are disposed in a common plane.

11. The vehicle electric power steering assembly of claim 10, wherein the first transition location is located proximate the first end of the helical path to transfer the plurality of balls from the helical path to the recirculation path, the second transition location located proximate the second end of the helical path to transfer the plurality of balls from the recirculation path to the helical path, the second ellipse having a major axis extending from a major axis first end to a major axis second end.

12. The vehicle electric power steering assembly of claim 11, wherein the second ellipse comprises a major axis extending from a major axis first end to a major axis second end.

13. The ball screw assembly of claim 12, wherein the third segment first end is located at an intersection of the first ellipse and the second ellipse.

14. The ball screw assembly of claim 12, wherein the third segment second end is located at an intersection of the first ellipse and the second ellipse.

15. The ball screw assembly of claim 12, wherein the third segment first end and the third segment second end are each oriented tangentially to the first ellipse.

16. The ball screw assembly of claim 12, wherein the first segment extends from the first transition location to the third segment first end.

17. The ball screw assembly of claim 12, wherein the second segment extends from the second transition location to the third segment second end.

18. The ball screw assembly of claim 11, wherein a center of the second ellipse is offset from an axis of the helical path.

19. The ball screw assembly of claim 11, wherein the ball screw assembly is disposed in an electric power steering assembly of a vehicle.

20. A ball screw assembly comprising:
  a helical path for a plurality of balls to be routed through, the helical path extending from a first end to a second end; and
  a recirculation path extending from a first transition location to a second transition location, the first transition location located proximate the first end of the helical path to transfer the plurality of balls from the helical path to the recirculation path, the second transition location located proximate the second end of the helical path to transfer the plurality of balls from the recirculation path to the helical path, the recirculation path defined by at least portion of a first ellipse and at least a portion of a second ellipse disposed in a common plane.

* * * * *